United States Patent Office

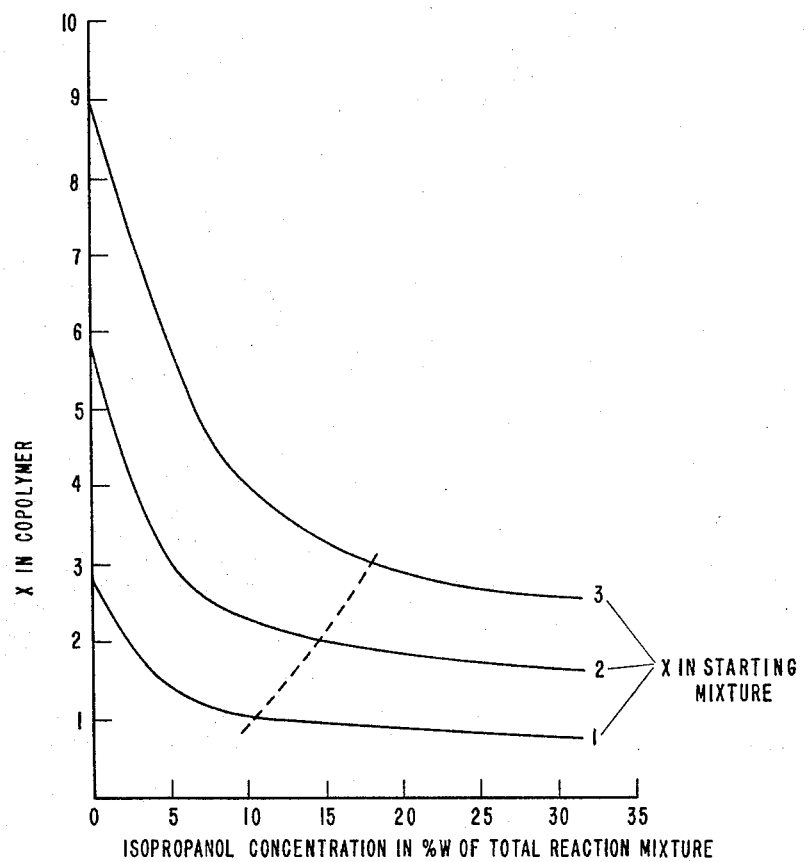
INFLUENCE OF ISOPROPANOL ON COPOLYMERIZATION OF
[STEARYL METHACRYLATE (SMA) + LAURYL METHACRYLATE (LMA)]
AND METHACRYLIC ACID (MA)
(SMA + LMA) : MA = 10 : X
INVENTORS:
PIETER H. VAN DER MEY
ARNOLD A. BUITELAAR
BY: James H. Parker
THEIR ATTORNEY

3,281,391
Patented Oct. 25, 1966

3,281,391
PROCESS FOR PREPARING HYDROCARBON-
SOLUBLE COPOLYMERS
Pieter H. van der Mey and Arnold A. Buitelaar, Amsterdam, Netherlands, assignors to Shell Oil Company, New York, N.Y., a corporation of Delaware
Filed Aug. 22, 1963, Ser. No. 303,902
Claims priority, application Netherlands, Aug. 30, 1962, 282,672
7 Claims. (Cl. 260—33.6)

This invention relates to polymeric lubricating oil additives. More particularly, the invention relates to the preparation of hydrocarbon-soluble polymers of unsaturated carboxylic acids.

Specifically, the invention provides a process for preparing hydrocarbon-soluble copolymers especially suitable as lubricating oil additives which comprises reacting in a substantially homogeneous medium (1) an unsaturated carboxylic acid, particularly an alpha,beta-vinylidene carboxylic acid, and (2) a monomer having a lower activity than the unsaturated carboxylic acids, particularly the esters of said carboxylic acids and alcohols having from about 8 to 30 carbon atoms, in the presence of an associating substance having an oxygen or nitrogen atom with a lone electron pair in the molecule, soluble in the medium and which associates with said unsaturated carboxylic acid.

The hydrocarbon-soluble copolymers of unsaturated carboxylic acids are generally prepared by dissolving the monomers in a solvent and effecting copolymerization at elevated temperature in the presence of a radical-forming compound.

The relative proportions in which the monomers are incorporated in the growing copolymeric molecule depend on the reactivities of the monomers concerned. If these reactivities differ, then the more reactive monomer will be incorporated in the growing polymer faster than the less reactive one, with the result that the molar ratio of incorporated monomers will be different from that of the monomers in the starting mixture, while moreover, the copolymer will not be homogeneous in composition. In such cases it is usual to choose the molar ratio of the more reactive to the less reactive monomer in the starting mixture smaller than the ratio required in the copolymer, and then to incrementally add a portion of the more reactive monomer during copolymerization.

In practice, such copolymerization runs into difficulty from the retarding factors which will often rise, quite unpredictably, during initiation of the copolymerization and which make it necessary to follow the course of the reaction very closely before, during and after each addition and to adapt each addition to the previous findings. The present invention relates to a process for the copolymerization of monomers with different reactivity, where such incremental addition, or "programming," is not necessary.

It is therefore the primary object of the present invention to provide a process for preparing homogeneous copolymers of unsaturated carboxylic acids and less reactive long chain methacrylic esters wherein the incremental addition of the more reactive unsaturated carboxylic acid is eliminated. Other objects will become apparent to one skilled in the art from the following disclosure.

These objects are accomplished by the process of the present invention which provides a method for preparing hydrocarbon-soluble copolymers especially suitable as lubricating oil additives which comprises reacting in a substantially homogeneous medium (1) an unsaturated carboxylic acid, particularly an alpha,beta-vinylidene carboxylic acid, and (2) a monomer having a lower activity than the unsaturated carboxylic acids, particularly the esters of said carboxylic acids and alcohols having from about 8 to 30 carbon atoms, in the presence of an associating substance having an oxygen or nitrogen atom with a lone electron pair in the molecule, soluble in the medium and which associates with said unsaturated carboxylic acid.

It is obvious that the process of the present invention is especially suitable for the preparation of copolymers wherein the activity or reactivity of one monomer is less than the activity of the second monomer. As noted above, the more reactive monomer, reacts more readily, i.e., has a faster reaction rate, resulting in a non-homogeneous polymer due to such unequal reaction rates. As used herein, the phrase "lower activity" is construed to mean that the more active monomer has a reaction rate of at least 10% faster than the monomer having the lower activity, or reaction rate.

The drawing illustrates the influence of isopropanol on the copolymerization of [stearyl methacrylate (SMA) + lauryl methacrylate (LMA)] and methacrylic acid (MA) at various concentrations of isopropanol and various ratios of (SMA+LMA) to (MA).

The rates of incorporation of the monomers alter through the addition of the substance associating with the unsaturated acid. The "correct" quantity of associating substance giving rates of monomer incorporation equal to one another is easily found experimentally by copolymerizing the monomers to a low conversion percentage in the presence of varying quantities of the associating substance and determining the number of carboxylic groups in the resulting copolymer.

As a result of the equal rates of monomer incorporation, the molar ratio of the incorporated monomers becomes the same as that of the monomers in the starting mixture, thus making the incremental addition of the more reactive monomers superfluous.

It has been found from infrared analysis that influencing the incorporation rates by the associating substance is accompanied by a shift to the right in the equilibrium $(AH)_2 \rightleftharpoons 2AH$, in which shift (arising upon addition of the associating substance and dependent on the quantity thereof) the AH associates with the associating substance via formation of a hydrogen bridge. $(AH)_2$ represents the dimer, formed by the two-fold formation of a hydrogen bridge between two molecules of the unsaturated carboxylic acid AH.

Preference is given to an associating substance that has one oxygen atom in the molecule linked to carbon, but other oxygen compounds, such as, for example, water, are also suitable.

Particular preference is given to an associating substance in which the oxygen atom which is attached to carbon is present in the form of hydroxyl oxygen, ether oxygen or carbonyl oxygen. Of these, the aliphatic alcohols, aliphatic ethers, aliphatic ketones and aliphatic carboxylic acids are very suitable.

Examples of the alcohols include methanol, ethanol, propanol, isopropanol, butanol, isobutanol, pentanol, hexanol and their homologues. Preferred alcohols are those aliphatic alcohols having at least three carbon atoms in the molecule.

Examples of aliphatic ethers that may be used are dimethyl ether, diethyl ether, 1,2-dimethoxyethane, 1,2-dimethoxypropane and cyclic ethers such as dioxane.

Examples of ketones are dimethyl ketone, methyl ethyl ketone, diethyl ketone and their homologues.

Examples of aliphatic acids that may be used are formic acid, acetic acid, propionic acid and their homologues.

Of this group of compounds, the most active are the aliphatic alcohols. Of the alcohols, isopropanol is very suitable.

Generally, preference is given to the associating substance that boils at the same or at a higher temperature than that at which copolymerization is carried out.

Suitable solvents in which to carry out the copolymerization are the hydrocarbon solvents, such as, for example, benzene, toluene or the xylenes.

Examples of particularly suitable unsaturated carboxylic acids are the alpha,beta-vinylidene carboxylic acids such as, for example, acrylic acid, methacrylic acid, itaconic acid, and crotonic acid as well as other unsaturated carboxylic acids including maleic acid and fumaric acid.

A particularly suitable application of the invention is in the preparation of copolymers of unsaturated acids with esters of unsaturated acids and alcohols with 8–30 carbon atoms, and in the preparation of copolymers of these acids with monomeric hydrocarbons with an activated double bond such as styrene.

Copolymers can be very suitably prepared according to the invention from methacrylic acid and esters of methacrylic acid and alcohols with 12–18 carbon atoms with the use of isopropanol as the associating substance.

In order to illustrate the invention, the following examples are given. The reactants, their proportions, and other specific ingredients of the recipes are presented as being typical and various modifications can be made in view of the foregoing disclosure without departing from the spirit or scope of the disclosure or of the claims. Unless otherwise specified, parts and percentages disclosed in the examples are by weight.

The copolymers mentioned in the examples were all prepared in accordance with the following general recipe: the copolymerizations were carried out in benzene as the solvent and in an atmosphere of pure nitrogen at a temperature of 70° C. As initiator, benzoyl peroxide was used in a quantity of 0.05 percent by weight of the total reaction mixture. The reaction vessel was filled with monomers, solvent and initiator with or without the associating substance; the contents were then cooled to 0° C. Next pure nitrogen was bubbled through the mixture until the oxygen content of the escaping nitrogen amounted to 2 parts by volume or less per million parts by volume of nitrogen. Then, with rapid stirring, the mixture was brought to the polymerization temperatures of 70° C. After a short while, long enough for a conversion of monomer to copolymer of a few percent, the copolymerization was stopped by pouring the reaction mixture out into a tenfold volume of cold methanol, in which 0.01 percent by weight of hydroquinone had been dissolved. The copolymer formed, which is insoluble in methanol, was filtered off, washed with methanol and dissolved in benzene. The copolymer was then isolated from the benzene solution by freeze-drying and analysed by titration with a 0.1 N solution of potassium hydroxide in ethanol. From the acid value found, the molar ratio of the monomers in the copolymer was calculated.

EXAMPLE I

Methacrylic acid (MA) was copolymerized with a 1:1 molar mixture of stearyl methacrylate (SMA) and lauryl methacrylate (LMA). The molar ratio of (SMA+LMA):MA was 10:3. The initial concentration of the total amount of monomers in the solvent or the mixture of solvent and associating compound was 32.5% w. The results are given in Table I.

*Table I*

| Molar Ratio (SMA+LMA): MA in Starting Mixture | Percent Conversion into Copolymer | Associating Compound Used | Concentration | | Molar Ratio (SMA+LMA): MA in Copolymer |
|---|---|---|---|---|---|
| | | | Percent w. | Mol/l. | |
| 10:3 | 3 | None | | | 10:8.9 |
| 10:3 | 5 | Isopropaol | 6.8 | 1 | 10:4.7 |
| 10:3 | 5 | ____do____ | 18.0 | 2.5 | 10:3.1 |
| 10:3 | 2 | Acetic acid | 6.8 | 1 | 10:5.2 |
| 10:3 | 4 | Dimethoxyethane | 27.0 | 2.5 | 10:3.5 |
| 10:3 | 2 | Methyl ethyl ketone | 21.6 | 2.5 | 10:5.9 |

It appears from this table that the amount of methacrylic acid incorporated in the copolymer is reduced under the influence of isopropanol, acetic acid, dimethoxyethane and methyl ethyl ketone, and that the activity of isopropanol is the greatest in this respect.

EXAMPLE II

A (1:1) molar mixture of SMA and LMA was copolymerized with methacrylic acid at different molar ratios. The initial concentration of the total amount of monomer was 32.5% w. For each ratio the amount of methacrylic acid incorporated in the resulting copolymer was determined in relation to the amount of isopropanol added; the percent conversion of monomers to copolymer varied from 3–6. The results are given in the drawing. From the drawing, it appears that at molar ratios for (SMA+LMA):MA in the starting mixture of 10:1, 10:2 and 10:3 the amount of isopropanol needed to give the same (SMA+LMA):MA ratio in the copolymer as in the starting mixture amounts to 10.5, 14.5 and 18.0% w., respectively, calculated on total reaction mixture.

EXAMPLE III

A 1:1 molar mixture of SMA and LMA was copolymerized with methacrylic acid in the molar ratio (SMA+LMA):MA of 10:3. The monomer concentration was as in Example II. The quantity of isopropanol in the starting mixture was 18.0% w. calculated on total mixture. By occasional sampling and analysis of the samples the composition of the copolymer was determined relative to the conversion of the monomers to copolymer. The results are listed in Table II.

*Table II*

| Percent conversion of monomers: | Ratio (SMA+LMA):MA in copolymer |
|---|---|
| 11.4 | 10:3.12 |
| 25.4 | 10:3.10 |
| 49.2 | 10:3.11 |
| 67.8 | 10:3.10 |
| 95.5 | 10:3.13 |

This table shows that azeotropic copolymerization of SMA, LMA and MA is possible at any conversion percentage in the presence of an associating substance in the reaction mixture.

EXAMPLE IV

Acrylic acid was copolymerized with lauryl methacrylate in benzene with and without addition of isopropanol as associating compound. Just as in the preceding examples, the initial concentration of the mixture of polymers was 32.5% w. The quantity of initiator added, however, was not 0.05% w., but 0.07% w. of benzoyl peroxide. At a 3:1 molar ratio of the monomers lauryl methacrylate and acrylic acid in the starting mixture the molar ratio of the incorporated monomers was 3:2.62 in the absence of isopropanol and 3:0.95 in the presence of 18.0% w. isopropanol in the reaction mixture.

We claim as our invention:

1. A process for preparing hydrocarbon-soluble copolymers which comprises reacting in a substantially homogeneous medium consisting essentially of a hydrocarbon solvent (1) alpha,beta-vinylidene carboxylic acid containing from 3 to 5 carbon atoms and (2) esters of said alpha,beta-vinylidene carboxylic acids and saturated aliphatic alcohols containing from 12 to 18 carbon atoms in the presence of (3) an associating substance selected from the group consisting of (a) aliphatic alcohols containing at least three carbon atoms in the molecule, (b) aliphatic ethers containing up to 5 carbon atoms, (c) aliphatic ketones containing up to 4 carbon atoms and (d) aliphatic carboxylic acids containing up to 3 carbon atoms, wherein the molar ratio of (1) to (2) is from about 1:10 to about 3:10 and the amount of (3) is up to about 27% by weight of the total reaction mixture.

2. A process as in claim 1 wherein the associating substance is isopropanol.

3. A process as in claim 1 wherein the associating substance is acetic acid.

4. A process as in claim 1 wherein the associating substance is dimethoxy ethane.

5. A process as in claim 1 wherein the associating substance is methyl ethyl ketone.

6. A process as in claim 7 wherein the methacrylic esters are a 1:1 molar mixture of lauryl methacrylate and stearyl methacrylate.

7. A process for preparing hydrocarbon-soluble copolymers which comprises reacting in benzene, (1) from 1 to 3 moles of methacrylic acid and (2) 10 moles of methacrylic esters of saturated aliphatic alcohols containing from 12 to 18 atoms in the presence of (3) up to 27% by weight of the total reaction mixture of isopropanol.

References Cited by the Examiner

UNITED STATES PATENTS

| 2,612,475 | 9/1952 | Bartlett. | |
| 2,798,868 | 7/1957 | Miller | 260—86.1 |
| 2,980,655 | 4/1961 | Glass et al. | 260—86.1 |
| 3,046,226 | 7/1962 | Sandberg et al. | 260—86.1 |

MORRIS LIEBMAN, *Primary Examiner.*

L. T. JACOBS, *Assistant Examiner.*